United States Patent [19]

Daprato

[11] Patent Number: 5,167,036
[45] Date of Patent: Dec. 1, 1992

[54] NOSE PROTECTOR

[76] Inventor: Gary A. Daprato, 144 Henderson Avenue, #3, Thornhill, Canada, L3T 2L5

[21] Appl. No.: 745,771

[22] Filed: Aug. 16, 1991

[30] Foreign Application Priority Data

Aug. 17, 1990 [CA] Canada ............................ 2023557

[51] Int. Cl.⁵ ............................................ A41D 13/00
[52] U.S. Cl. ............................................ 2/2; 2/424; 2/426; 2/9; 2/13
[58] Field of Search ................. 2/2, 424, 426, 445, 2/446, 9, 12, 13; 351/41, 131, 132

[56] References Cited

U.S. PATENT DOCUMENTS

| | | | |
|---|---|---|---|
| 1,043,649 | 11/1912 | Wendell | 2/9 |
| 1,048,191 | 12/1912 | Maurice | 2/9 |
| 3,052,887 | 9/1962 | Sockel et al. | 2/2 |
| 3,346,875 | 10/1967 | Weisberger | 2/12 |

FOREIGN PATENT DOCUMENTS

831877  2/1952  Fed. Rep. of Germany ............ 2/2

Primary Examiner—Werner H. Schroeder
Assistant Examiner—Gloria Hale
Attorney, Agent, or Firm—Bereskin & Parr

[57] ABSTRACT

A nose protector for mounting on eyeglasses to shield the nose of the wearer includes a shield for covering the upper surface of the nose. Channels are provided at each side of the shield for the receiving portion of the eyeglasses and a resilient member is provided for extending across the open channels for releasably retaining the portions of the eyeglasses in the channels.

25 Claims, 7 Drawing Sheets

NOSE PROTECTOR

FIELD OF THE INVENTION

This invention relates to a nose protector, and in particular to a nose protector for mounting on eyeglasses to shield the nose of the wearer from the sun.

As used herein, the term eyeglasses is used to indicate any form of eyeglasses, including sunglasses and eyeglasses provided with plain or vision correcting lenses.

When outdoors, the nose tends to receive relatively prolonged exposure to the sun compared to other parts of the body and as such is more likely to become "sun burned". In addition to the undesirable short-term effects of over exposure of skin to the sun such as burning, peeling and blistering, it also appears that exposure to the sun plays a significant role in the propensity of the skin to skin cancer. For this reason, many persons take steps to protect their skin from exposure to at least the elements of radiation from the sun which are believed to be harmful. One method is to apply a "sunscreen" which filters out the harmful radiation, these sunscreens being in the form of a cream or liquid which is applied directly to the skin. Such creams or liquids can be very effective, but may have to be repeatedly applied to replace cream or liquid which has been wiped off through contact with clothing or a towel or washed away, for example, by swimming or sweating. Also, creams having higher "sun protection factors" tend to be visible on the skin, and may also give the appearance and feel of the skin being wet or greasy.

Actual physical barriers have also been utilized to provide a shield from the sun, including simple "homemade" shields formed of folded cards or paper which a user would typically hold in place by trapping the shield beneath a pair of sunglasses. Such a paper or card shield is unlikely to last for any extended period, would be easily dislodged and would have to be repositioned every time the wearer removed and replaced the sunglasses. At least one ready made nose protector is available from Health Saver Products, a Division of Health Saver Limited of Grimsby, Ontario, and is sold as the "Sun Guard". This plastic shield is shaped as a shallow arc to fit over the nose and includes a flexible tab at the upper end to suspend the shield from the cross portion of a pair of glasses. The shield thus remains attached to the glasses, but tends to hang loosely from the glasses and may move, particularly if the wearer is taking part in an activity such as cycling, causing irritation and discomfort, and possibly exposing the nose of the wearer to the sun.

SUMMARY OF THE INVENTION

According to a first aspect of the present invention there is provided a nose protector for mounting on eyeglasses to shield the nose of the wearer from the sun. The nose protector includes a shield adapted for covering the upper surface of the nose. The shield is mounted on eyeglasses by means of attachment means defining two open channels, one located at each side of the shield. The channels are adapted to receive portions of the eyeglasses, typically portions of the frame or nose supports. Retaining means are provided and are resiliently located to releasably retain the portions of the eyeglasses in the channels.

The retaining means may define a side of each channel and serve to simply clamp or grip the frame portions in the channels, or may extend across the channels to releasably retain the frame portions therein.

The provision of the two mounting locations for the shield, formed by the attachment means, assists in mounting the shield firmly and securely on the eyeglasses, and the resilient retaining means minimizes movement of the shield relative to the eyeglasses.

The open channels conveniently face inwardly of the respective sides of the shield and are also inclined upwardly and inwardly such that a wearer may push the nose protector from below, into the nose-rest portion of the eyeglasses where the open channels may engage frame portions such as the nose rests of the eyeglasses or the portions of the frame surrounding the lenses. As the nose protector is pushed into the nose-rest portion of the eyeglasses the retaining means is deflected to permit entry into the channels, and once the portion of the eyeglasses are received in the channels the retaining means adopts an undeflected configuration, or at least is biased towards such a configuration, and retains the portion of the eyeglasses in the channels.

A further aspect of the present invention provides a nose protector for mounting on eyeglasses to shield the nose of the wearer from the sun, comprising a shield for covering at least a portion of the upper surface of the nose and attachment means for mounting the shield on the eyeglasses. The attachment means define two open channels for releasably receiving and retaining portions of the eyeglasses, one channel being located on each side of the shield.

BRIEF DESCRIPTION OF THE DRAWINGS

These and other aspects of the present invention will now be described, by way of example, with reference to the accompanying drawings in which.

DETAILED DESCRIPTION OF DRAWINGS

Figure 1:
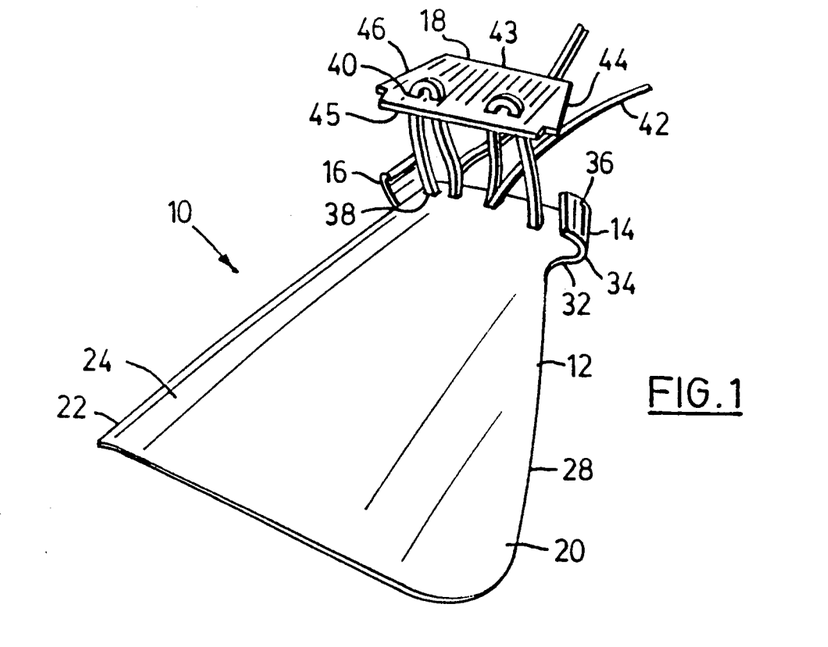
FIG. 1 is a perspective view from above of a nose protector in accordance with a preferred embodiment of the present invention, shown partially disassembled.
Figure 2:
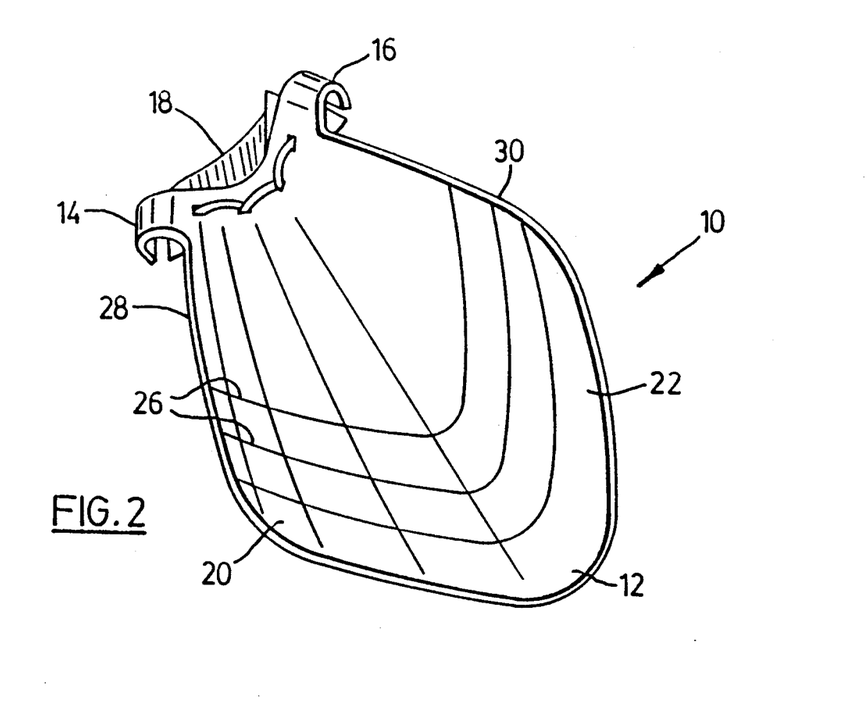
FIG. 2 is a perspective view from below of the nose protector of FIG. 1, shown fully assembled.

Reference is first made to FIGS. 1 and 2 of the drawings, which illustrate a nose protector 10 in accordance with a preferred embodiment of the present invention, the nose protector 10 being shown in the final stages of assembly in FIG. 1. The main components of the nose protector 10 are a shield 12 shaped to fit over and cover the upper surface of person's nose, attachment means in the form of open channels 14, 16 and means for releasably retaining portions of eyeglasses in the open channels 14, 16 in the form of a resilient member 18 for extending across the channels 14, 16.

The nose protector 10 is adapted to be mounted on eyeglasses, typically sunglasses, such that the shield 12 protects the nose of the wearer from the sun, and various exemplary methods for mounting the nose protector 10 on different forms of eyeglasses will be described hereinbelow, following a description of the structure of the nose protector 10.

The shield 12 is formed of a relatively thin sheet which is sufficiently rigid to retain the form of the shield, but which may be flexed to facilitate the mounting of the shield on eyeglasses. In one preferred form, the shield 12 comprises two substantially triangular side portions 20, 22 which meet at a central ridge 24. Thus, the shield 12 may be conveniently formed from a substantially kite-shaped sheet of thermoplastic material which is heated and then bent along its main axis to the desired form. Alternatively, the shield 12, and also the member 18, may be formed by injection moulding. Decals or some other form of decoration may be applied to the surface, or the shield may be formed of a material which the users may decorate themselves.

FIG. 2 illustrates the underside of the shield 12, and it will be noted that this includes a number of markings in the form of lines 26 extending across the surface of the shield. The lines 26 are configured such that when the nose protector is mounted on eyeglasses the lines will extend horizontally. The lines 26 are provided to permit the shield 12 to be easily cut by a user such that the shield will correspond to the user's nose size. To assist in this operation, the lines 26 are formed as indentations in the shield which facilitate following and cutting of the shield 12 along a line by, for example, an ordinary pair of scissors. Although the Figure only illustrates three lines, up to ten lines may be provided such that a shield may be easily cut to suit a wide variety of nose sizes.

The open channels 14, 16 are provided at the upper end of the shield, one mounted to each side portion 20, 22 of the shield. Each channel 14, 16 faces inwardly of the respective side of the shield and is inclined upwardly and inwardly. In the illustrated nose protector 10, the channels 14, 16 are aligned with the respective side edges 28, 30 of the shield.

To facilitate engagement of the channels 14, 16 with the eyeglasses, the channels extend laterally beyond the side edges 28, 30 and above the upper end of the shield. It is further preferred that the channels 14, 16 are integral with the shield such that the rear wall 32 of each channel lies substantially flush with the adjacent side portion 20, 22. A base wall 34 defines the base of each channel and a front wall 36 extends from the base wall 34 and lies substantially parallel to the respective rear wall 32 and side portion 20, 22.

The resilient member 18 is mounted to the upper end of the shield and extends across the channels 14, 16. The member 18 is formed of a resilient material, such as woven fabric backed rubber, and extends above the upper end of the shield 12. The member 18 is attached, at a lower portion, by a flexible member or strand 42 which is sewn through the shield 12 and the member 18. From FIG. 1 it will be noted that each of the shield 12 and the resilient member 18 are provided with four apertures 38, 40 through which the flexible strand 42 passes. The strand 42, which is formed of rubber, is knotted between the shield 12 and member 18. The strand 42 may be trimmed such that the ends of the strand are not visible above the member 18, or may be permitted to extend above the member 18 to appear as "whiskers".

The upper and lower edges 43, 45 of the member 18 are substantially mutually parallel though the side edges 44, 46 of the member are inclined upwardly and inwardly relative to the shield 12 and are parallel to and spaced inwardly from the ends of the front walls 36 of the channels 14, 16. The lower edge of the member 18 is located below the lower edge of the front walls 36 of the channels 14, 16 and the lower ends of the side edges 44, 46 which extends below the front walls 36 are cut inwardly.

The resilient member 18 is preferably formed from an originally flat length of material having some memory such that the side portion of the member 18, which are not secured to the shield 12, will be spaced from the curved shield and lie substantially flush with the front walls 36 of the respective channels 14, 16. This permits the side edges 44, 46 of the member 18 to be deflected rearwardly towards the shield 12 as the nose protector is being fitted to eyeglasses to allow portions of the eyeglasses to pass into the channels 14, 16 and the side portions of the member 18 to then return to the undeflected position and partially close the channels.

Figure 3:
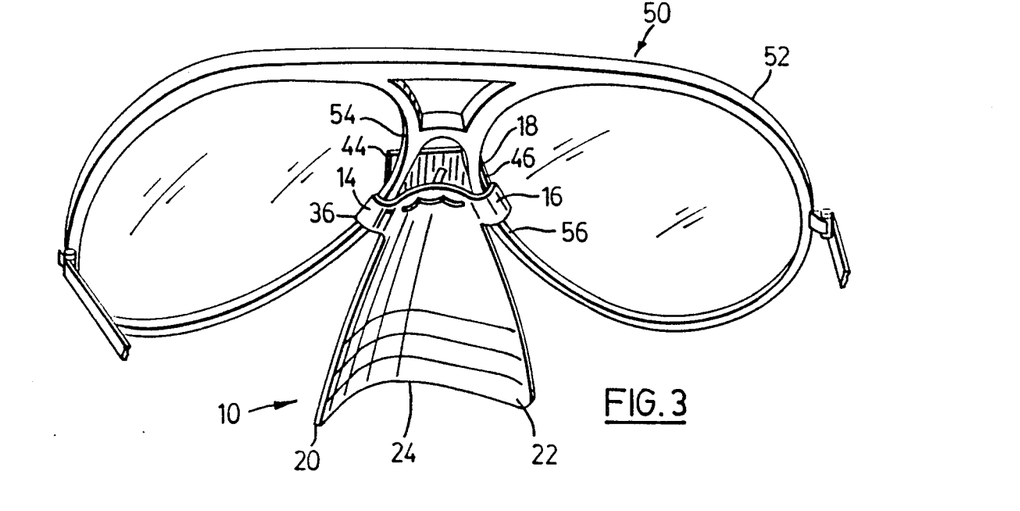
FIGS. 3-6 are perspective views from the rear of the nose protector of FIG. 1 mounted on various forms of eyeglasses.

Reference is now made to FIG. 3 of the drawings which illustrates the nose protector 10 mounted on eyeglasses 50 having a one-piece, hard plastic frame 52. The portions of the frame 54, 56 which normally rest on the nose of the wearer are located within the channels 14, 16 and are retained therein by the resilient member 18. The protector 10 may be located on eyeglasses of this form by, for example, bending the shield 12 about the central ridge 24 to bring the side portions 20, 22 and the channels 14, 16 closer together. The resilient member 18 is also bent by this action, but as the sides 44, 46 of the member 18 are not attached to the shield 12 the gaps between the side edges of the member 18 and the front walls 36 of the channels 14, 16 are opened sufficiently to receive the frame portions 54, 56 in the channels 14, 16. If the shield 12 is then released, the shield and the channels 14, 16 return to their undeflected configuration in which the sides of the resilient member 18 lie substantially flush with the front walls 36 of the channels. If the frame portions 54, 56 are of greater depth than the channels 14, 16 this is readily accommodated by the resilient member 18, the sides of which will be deflected outwardly by the frame portions and bear against the front surfaces of the frame portions 54, 56.

The nose protector 10 may be removed from the eyeglasses simply by carrying out the fitting operation in reverse.

Figure 4:
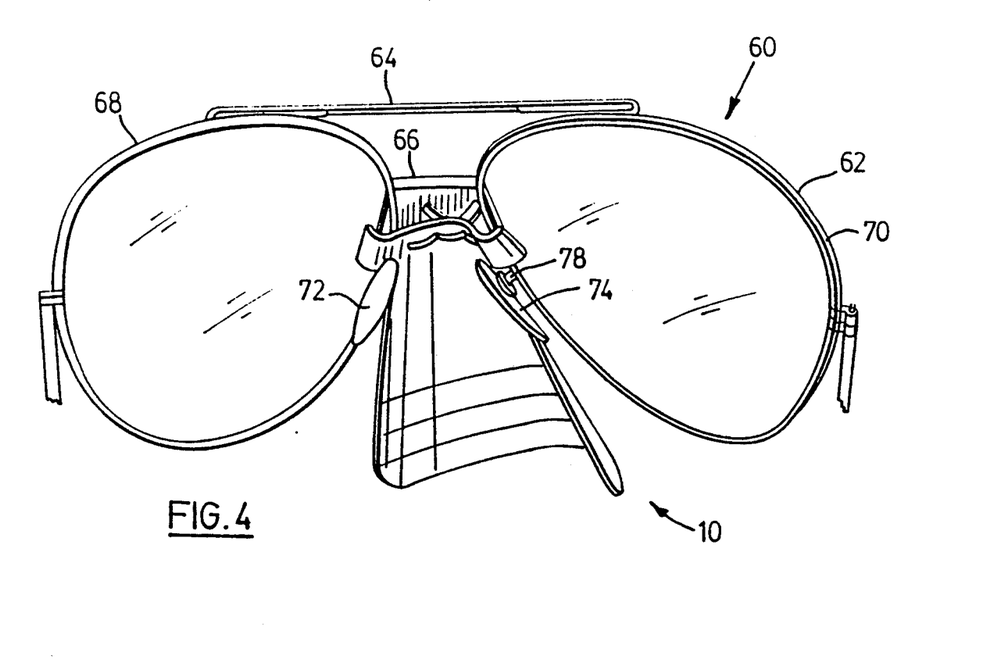
Figure 5:
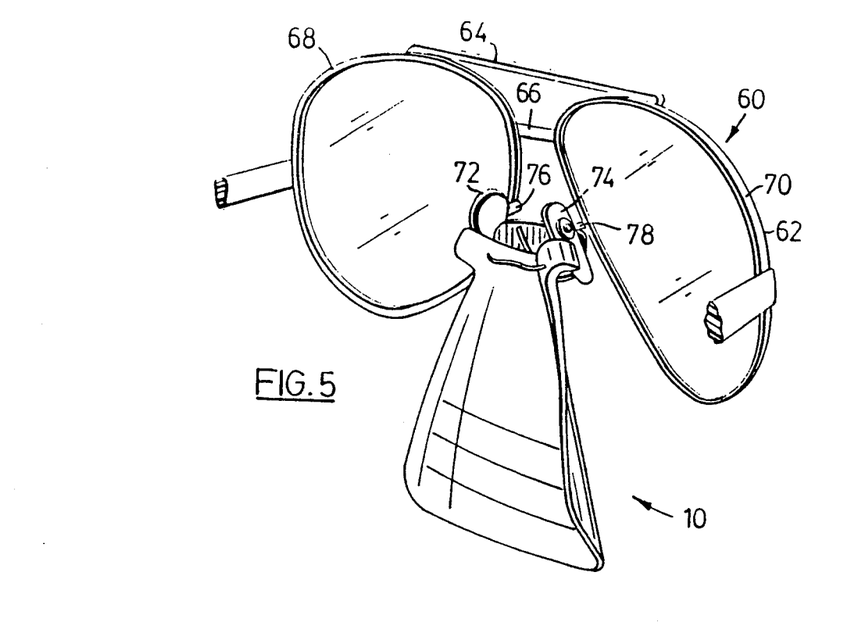

FIGS. 4 and 5 of the drawings illustrate the nose protector 10 mounted on a different form of eyeglasses 60 having a thin metal frame 62 including two cross portions 64, 66, two lens retaining portions 68, 70 and two nose supports 72, 74 mounted to the portions 68, 70 by legs 76, 78.

In FIG. 4 the nose protector 10 is shown mounted between the lower cross portions 66 and the nose supports 72, 74. For this form of frame 62, the lens retaining portions 72, 74 may lie substantially flush with the lenses such that there is no frame portion to extend into the channels 14, 16, defined by the walls 32, 34, 36 as with the example as described with reference to FIG. 3. The nose protector 10 is therefore retained on the eyeglasses by the clamping action of the resilient member 18 between the ends of the front walls of the channels 14, 16 and the sides of the resilient member 18. Further stability may be provided by positioning the rear wall 32 of each channel between the lens retaining portions 68, 70 of the frame and the nose supports 72, 74, or by resting the lower edges of the rear walls 32 on the nose support mounting legs 76, 78.

It will be evident that for mounting a shield on the eyeglasses 62 illustrated in FIGS. 4 and 5, and on, for example, "rimless" eyeglasses, a less complex channel configuration may be utilized: the shield 12 is retained on the eyeglasses by a simple clamping action, such that the attachment means may define channels formed by, for example, planar lateral members or extensions of the shield and retaining means in the form of a resilient member with sides spaced from the member or extensions which are deflected by the portions of the eyeglasses received therebetween.

In FIG. 5 of the drawings, the nose protector 10 is shown mounted directly on the nose supports 72, 74, which are retained in the channels 14, 16 by the resilient member 18. The nose protector 10 can be mounted, as shown in FIG. 5, on the lower portion of the nose supports 72, 74, or may be mounted on the upper portion of the nose supports 72, 74, where the resilient member 18 may rest on the nose support mountings 76, 78.

In configurations such as shown in FIG. 5, where the shield 12 will be resting directly on the nose of the wearer and is supporting the weight of the eyeglasses normally borne by the nose supports, it may be desired to provide some cushioning between the shield 12 and the nose. This may be achieved by providing a cushioned strand 42 or, alternatively, by mounting a small strip of foam or other cushioning material at the upper end of the shield.

Figure 6:
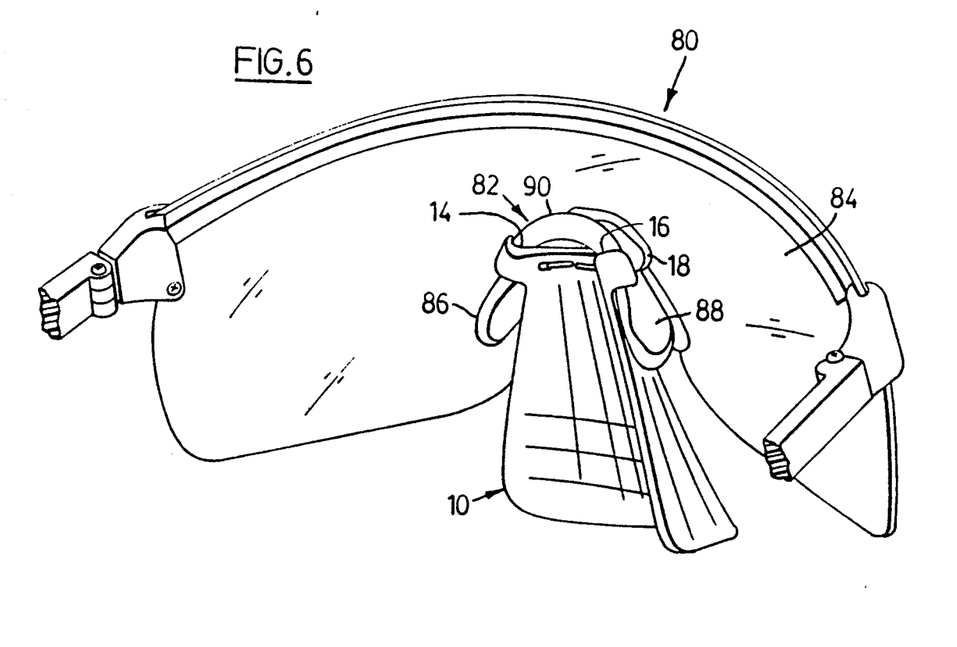

FIG. 6 of the drawing illustrates the nose protector 10 mounted on a pair of "wrap-around" sunglasses 80. The nose rest 82 of the sunglasses is formed in a central located cut-out in the "lens" 84 and includes two flaps 86, 88, which rest on the side of the nose, joined by a curved cross piece 90, spaced rearwardly of the lens 84.

The nose protector 10 is mounted on the sunglasses 80 by locating the ends of the cross-piece 90 in the channels 14, 16, where the cross piece 90 is retained by the resilient member 18. This particular configuration is attractive, as the channels 14, 16 and the resilient member 18 are concealed by the lens 84, only the shield 12 being visible when the glasses are worn.

Figure 7:
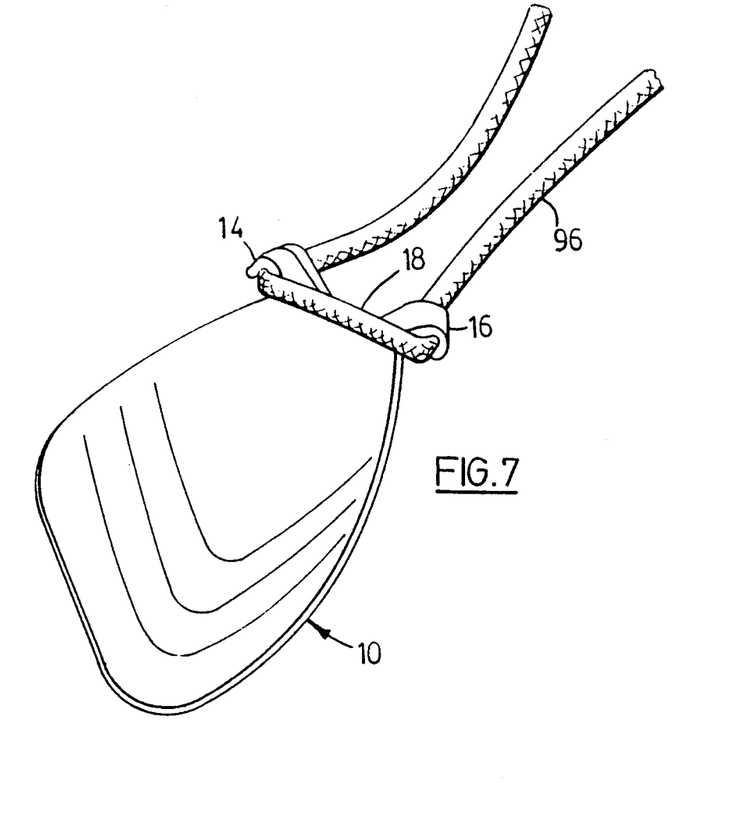
FIG. 7 illustrates the nose protector of FIG. 1 mounted on an eyeglass retaining cord.

FIG. 7 of the drawings illustrates a further useful feature of the present invention: the nose protector 10 may be mounted on an eyeglass retaining cord 96 that is commonly used to hang eyeglasses from the neck of a wearer when the eyeglasses are not being worn. The cord 96 is simply located in the channels 14, 16 and is retained by the resilient member 18. If the cord 96 is relatively thick, the resilient member 18 will bear against the cord 96 and prevent the nose protector from sliding on the cord. This particular feature is very useful for storing the nose protector 10 when the eyeglasses are being worn, but it is not desired to use the nose protector.

From the foregoing description it will be noted that the nose protector may be readily mounted on various forms of eyeglasses. It will be clear to those skilled in the art that the above illustrations of the utility of the nose protector 10 are not intended to be exhaustive, but are merely intended to illustrate at least a number of ways in which the nose protector may be used.

Figure 8:
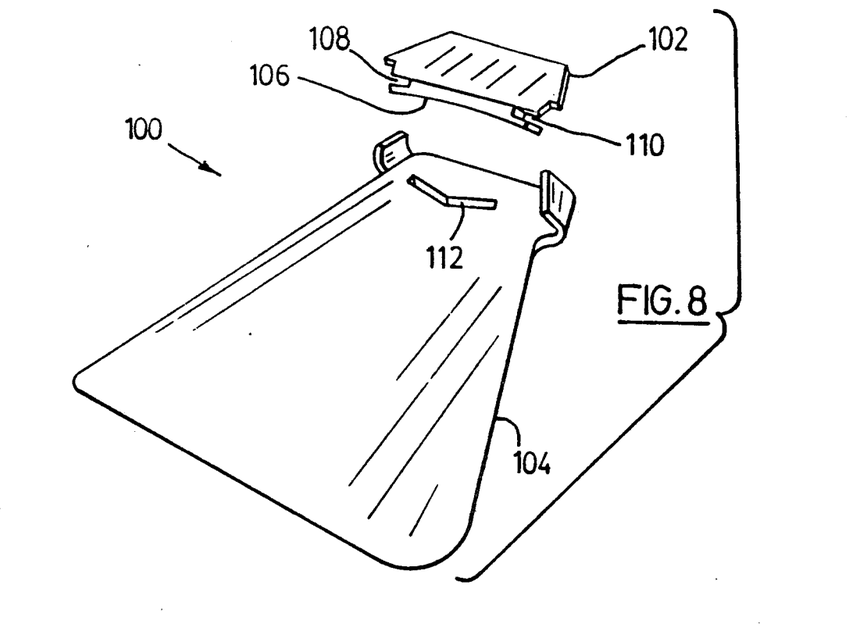
FIG. 8 is a perspective view from above of a nose protector in accordance with a further preferred embodiment of the present invention, shown partially disassembled.
Figures 9, 10, 11:
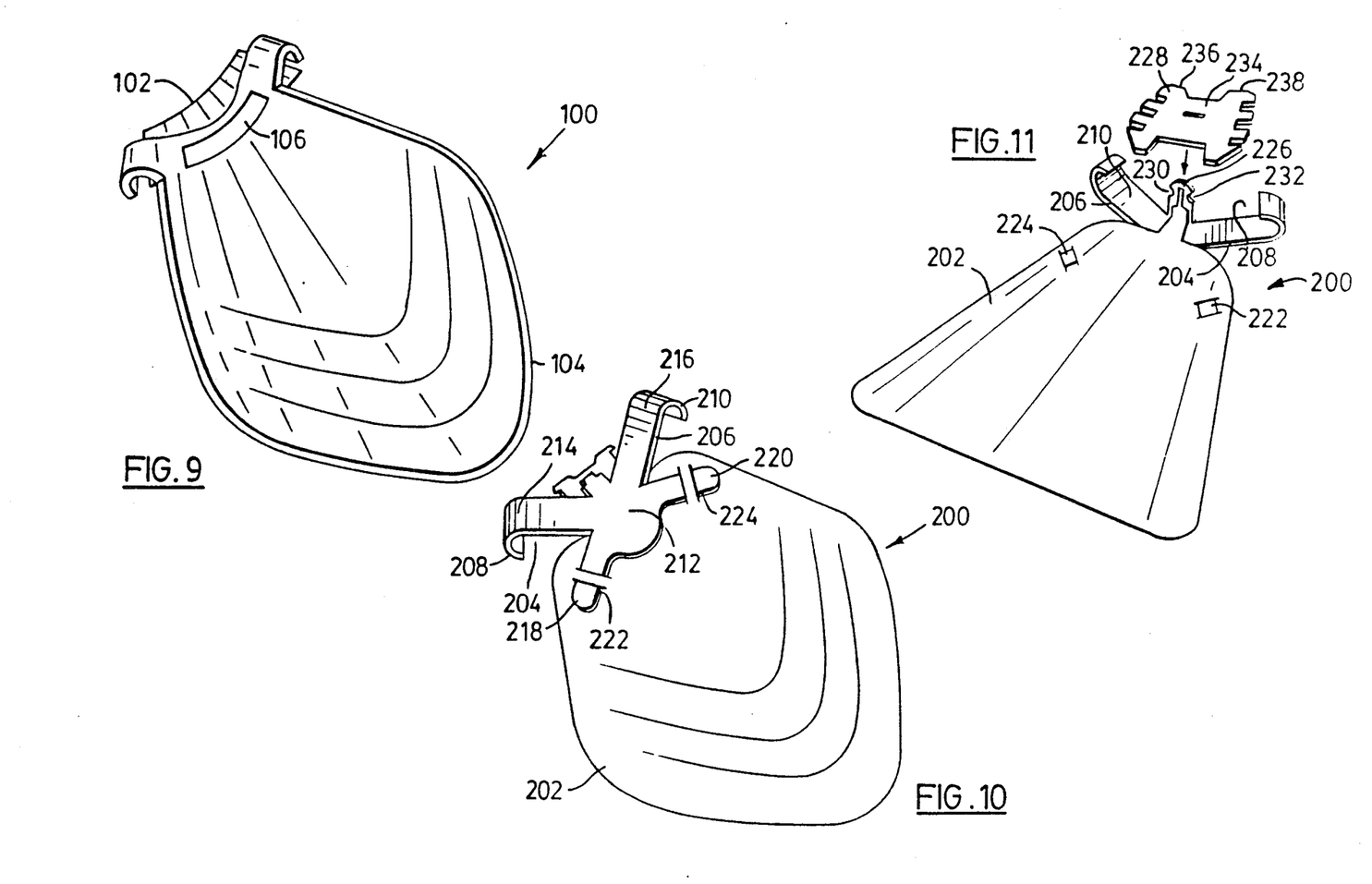
FIG. 9 is a perspective view from below of a nose protector of FIG. 8, shown fully assembled.
FIG. 10 is a perspective view from below of a nose protector in accordance with a still further preferred embodiment of the present invention.
FIG. 11 is a perspective view from above of the nose protector of FIG. 10, shown partially disassembled.

FIGS. 8 and 9 of the drawings illustrate a further form of nose protector 100, of generally similar configuration to the nose protector 10 described above. The nose protector 100 only differs in the method of attaching the resilient member 102 to the shield 104.

The member 102 is provided with a lower extension 106, with indented side channels 108, 110, which extends through a chevron-shaped opening 112 in the shield 104. The side edges of the extension 106 extend beyond the sides of the opening 112, which are located in the channels 108, 110 to securely mount the member 102 on the shield 104.

FIG. 10 of the drawings illustrates a still further form of nose protector 200. The nose protector 200 is adapted for mounting on eyeglasses in a similar manner to those described above, but is somewhat different in construction, as will be described herein below.

The shield 202 is of generally similar form as the shields described above, but is formed of somewhat thinner, more flexible plastic material. This is intended to minimize the possibility of injury caused to a wearer who is, for example, skiing and falls on their face. If the shield 202 is pushed up or into the face of the wearer, the thin material will tend to flex and bend and thus not be forced into the nose of the wearer. Due to the flexibility of the shield material, it is necessary to provide "reinforcement" for the upper side portions 204, 206 of the shield which form the channels 208, 210 for receiving the eyeglass frames. The reinforcement is provided by a clip portion 212 formed of a flat, plastic sheet, which is mounted to the rear of the shield 202. The clip portion 212 has four outwardly extending legs 214, 216, 218, 220 which extend outwardly in a X-type arrangement. The upper pair of legs 214, 216 and the upper side portions 204, 206 of the shield are bent over to define the channels 208, 210. The lower pair of legs 218, 220 are straight and pass through respective pairs of slits 222, 224 on the shield 202 for mounting the clip portion 212 to the shield 202. The clip portion 212 also includes a centrally located post 226 which is bent forwardly to provide mounting for the resilient member 228, as shown in FIG. 11 of the drawings. The post 226 has two indented side channels 230, 232 which extend through a slit in the member 228 to retain the member on the clip 212, and thus on the shield 202.

The resilient member 228 is formed of a thicker sheet of rubber and has a central portion 234 and two side portions 236, 238 which extend across the channels 208, 210. The side portions 236, 238 have tapered upper and lower ends to facilitate the location of the protector 200 on eyeglasses and the edges of the portions are cut-out for increased flexibility.

Figure 12:
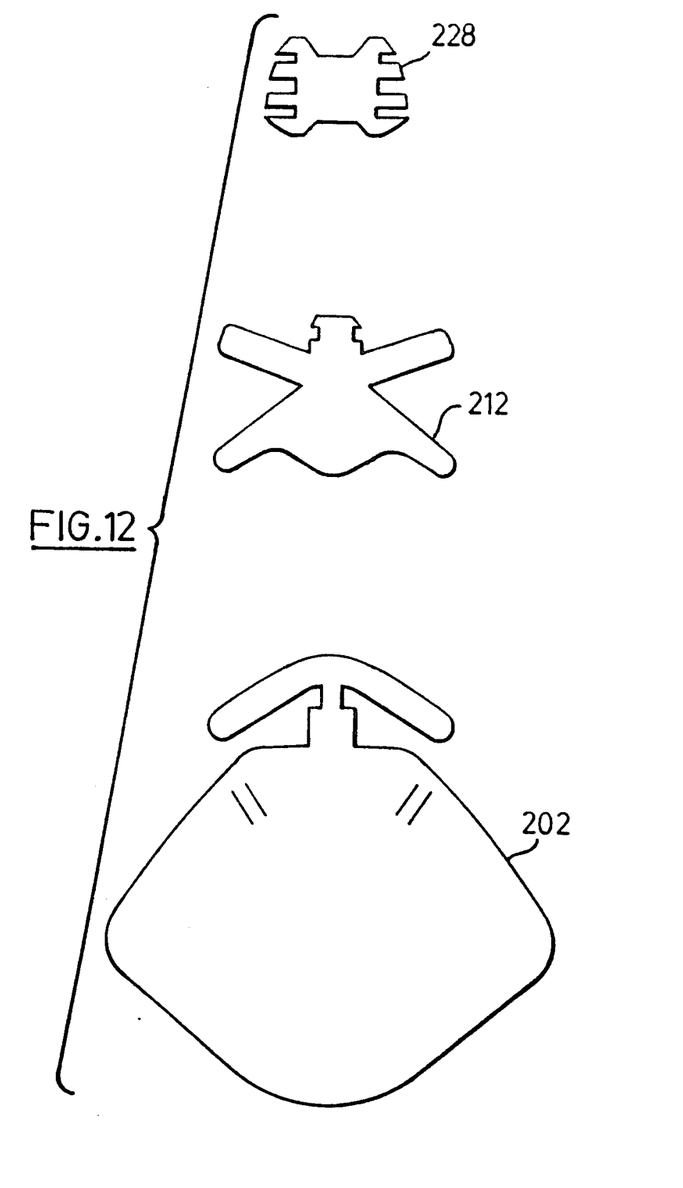
FIG. 12 is a plan view of the components of the nose protector of FIG. 10.

FIG. 12 of the drawings illustrates the forms of the shield 202, clip 212 and resilient member 228 as they are cut or stamped from flat sheet before being bent into the configurations as illustrated in FIGS. 10 and 11.

Figures 13, 14, 15:
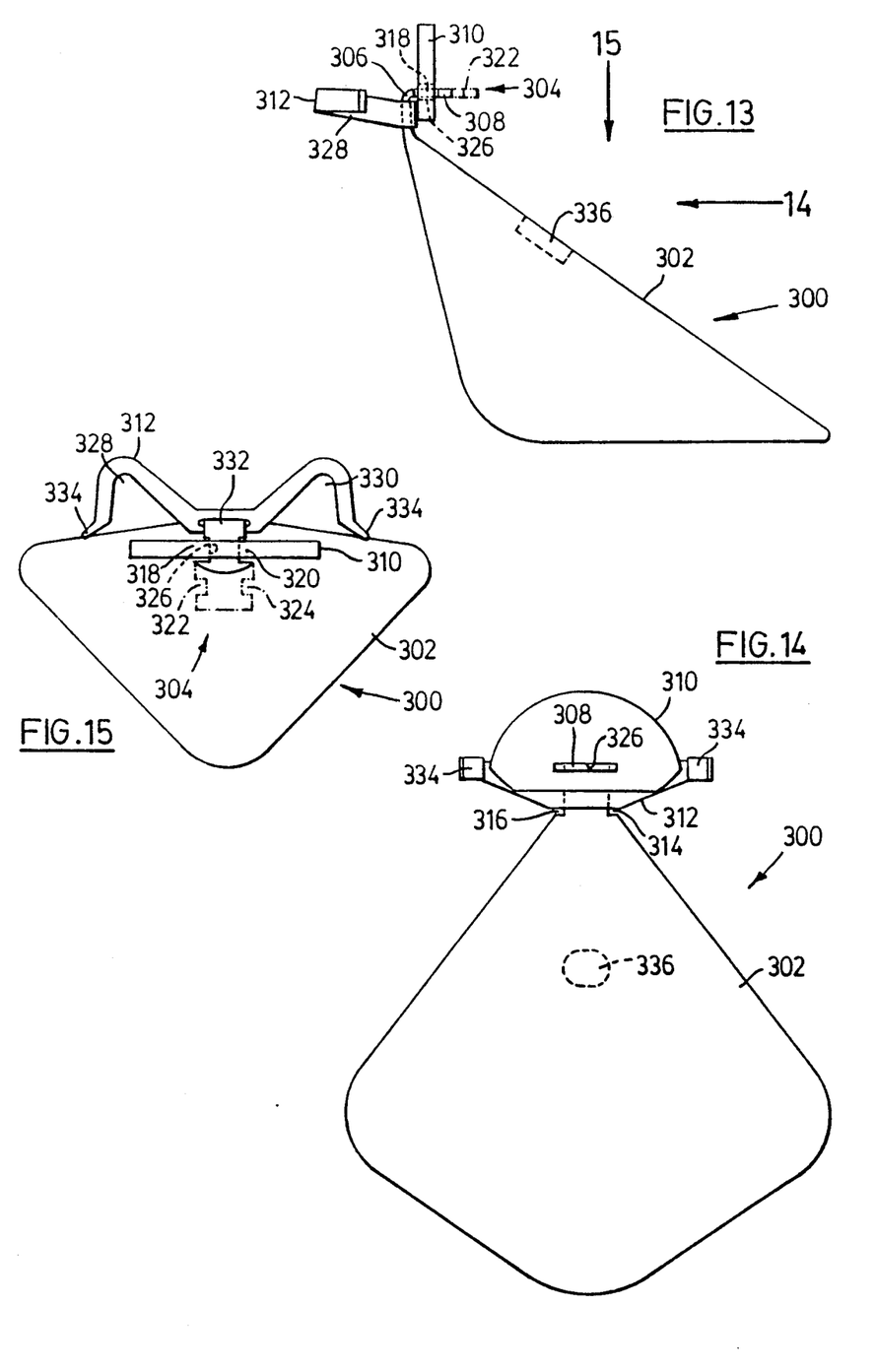
FIG. 13 is a side view of a nose protector in accordance with another embodiment of the present invention.
FIG. 14 is a frontal view of the nose protector of FIG. 13.
FIG. 15 is a plan view of the nose protector of FIG. 13.

FIGS. 13 to 15 of the drawings illustrate another embodiment of nose protector 300. The nose protector 300 is adapted for mounting on eyeglasses in a similar manner as described above, but it is somewhat different in construction as described below.

Shield 302 is of generally similar form as the shields described above, but includes a centrally located post 304 bent forwardly to provide mounting for resilient member 310 and attachment means in the form of a w-shaped brace member 312 as shown in FIG. 13. The post 304 comprises a generally vertical portion 306 and a generally horizontal portion 308, both of which may be flexed to facilitate the mounting of the shield on sunglasses.

The vertical portion 306 has two indented side channels 314, 316 (see FIG. 14) for retaining the brace member 312 thereon. The horizontal portion 306 has indented side channels 318, 320 (see FIGS. 13 and 15) which extend through a slit 326 in the resilient member 310 to retain the member on the post 304, and thus on the shield 302. It will be appreciated that the portion 306 may have additional side channels, for example side channels 322, 324 shown in ghost, to retain the resilient member 310 when the protector 300 is mounted onto eyeglasses with thick frames. If the frames are not very thick and the resilient member 310 is mounted as illustrated in the Figures, then the extra side channels 322, 324 may be cut off by the user as shown.

The brace member 312 forms channels 328, 330 for receiving the eyeglass frames. The brace 312 is mounted on the nose protector 300 by sliding the post 304 through a slit 332 in the central portion of the brace until the side channels 314, 316 are engaged. Toes 334 of the brace member 312 preferably rest against the lenses of the eyeglasses to further minimize movement of the shield 302 relative to the eyeglasses.

As shown in FIG. 13, the brace 312 is preferably angled slightly upwardly so that the point of contact between the brace and the eyeglass frame (as well as the point of contact between the toes 334 and the lenses) is at approximately the same level as the horizontal portion 308 of the post. This configuration tends to align clamping forces, namely the clamping force between the brace and the eyeglass frame and the opposite clamping force between the resilient member and the eyeglass frame, to prevent the shield 302 from unduly lifting off of the nose or pushing down onto the nose.

A cushioning member 336 made of foam, rubber or other cushioning material may be mounted at the upper end of the shield 302 between the shield and the nose.

It will be appreciated that the shape of the resilient member 310 is not restricted to the semicircular configuration in FIG. 14, but may be shaped like member 228 in FIG. 11 or any other desirable form.

It will be clear to those skilled in the art that the above described nose protectors are representative of only particular embodiments of the present invention, and that various modifications and improvements can be made to these nose protectors within the scope of the present invention. As mentioned briefly with reference to the eyeglasses illustrated in FIGS. 4 and 5, the attachment means may take a simpler form, though the preferred embodiments described are likely to be more suitable for use on a wider range of eyeglasses. Further, in the above described embodiments the resilient member is sewn onto the shield mounted in a slot on the shield or on a post extending from the shield: in other embodiments the resilient member could be affixed to the shield using adhesive, or could be mounted on short rods or buttons extending from the shield. The resilient member and attachment means may also be integral with the shield.

I claim:

1. A nose protector for shielding the nose of the wearer, said nose protector being adapted for mounting on eye-glasses of the kind having portions adapted to rest on the nose of said wearer, said nose protector comprising:
   (a) a shield for covering at least a portion of the upper surface of the nose, said shield having an upper portion and two lateral sides diverging from said upper portion;
   (b) attachment means for mounting said shield on said eye-glasses and at least partially defining two open channels for receiving said portions of said eye-glasses, one channel located adjacent each of said lateral sides; and
   (c) retaining means for releasably retaining said portions of said eye-glasses in said channels.

2. The nose protector of claim 1, wherein the retaining means is located across said open channels to releasably retain the portions of the eye-glasses therein.

3. The nose protector of claim 2, wherein the attachment means is located adjacent said upper portion of the shield.

4. The nose protector of claim 3, wherein the attachment means extends beyond said lateral edges at said upper portion of the shield.

5. The nose protector of claim 4, wherein the attachment means is formed by said upper portion of the shield and a reinforcing member mounted to the shield.

6. The nose protector of claim 5, wherein at least one of the shield and the attachment means is flexible to facilitate mounting of the shield on the eye-glasses.

7. The nose protector of claim 4, wherein each open channel faces inwardly of the lateral sides of the shield.

8. The nose protector of claim 7, wherein the open channels incline upwardly and inwardly.

9. The nose protector of claim 8, wherein each open channel has a rear wall, a base wall and a front wall, the rear wall extending laterally outwardly of the shield, the base wall extending outwardly of the; rear wall and the front wall extending from the base wall and being substantially parallel to the rear wall.

10. The nose protector of claim 9, wherein the rear walls of the channels lie substantially flush with the upper surface of the shield.

11. The nose protector of claim 1, wherein the retaining means is in the form of a resilient member which, in an undeflected configuration, extends at least partially across and restricts access to each open channel.

12. The nose protector of claim 11, wherein the resilient member is mounted on a post extending from the shield.

13. The nose protector of claim 9, wherein said front walls have opposed free ends, and wherein said retaining means comprises a resilient member which, in an undeflected configuration, extends at least partially across and restricts access to each open channel, the resilient member having side edges parallel to and spaced inwardly of said free ends of the respective front walls.

14. The nose protector of claim 13, wherein the resilient member extends above the attachment means and the upper portion of the shield.

15. The nose protector of claim 14, wherein the shield is formed of a thin sheet and has two substantially triangular side portions located in respective mutually inclined planes.

16. The nose protector of claim 15, wherein the resilient member is mounted on a post extending from the shield.

17. The nose protector of claim 1, wherein the shield is formed of a thin sheet and has two substantially triangular side portions located in respective mutually inclined planes.

18. The nose protector of claim 1, wherein the shield is formed of a thin sheet and said shield has an underside, said underside including a plurality of markings indicating lines along which the sheet may be cut to reduce the size of the shield.

19. The nose protector of claim 18, wherein said markings are in the form of indentations in the surface of the underside of the shield.

20. The nose protector of claim 11, wherein the shield is provided with a slot for receiving and retaining a portion of the resilient member.

21. A nose protector for shielding the nose of the wearer, said nose protector being adapted for mounting on eye-glasses of the kind having portions adapted to rest on the nose of said wearer, said nose protector comprising:
 (a) a shield for covering at least a portion of the upper surface of the nose, said shield having a pair of lateral sides; and
 (b) attachment means for mounting the shield on said eye-glasses and defining two open channels for releasably receiving and retaining said portions of the eye-glasses, one channel located adjacent each said lateral side of the shield.

22. The nose protector of claim 12 wherein said shield has an upper portion and said attachment means is located adjacent said upper portion.

23. The nose protector of claim 22 wherein the attachment means is connected adjacent said post.

24. The nose protector of claim 23 wherein said shield has an underside and including cushioning means attached to said underside.

25. The nose protector of claim 24 wherein said post has at least two indented side channels, one of said side channels for receiving the attachment means and another of said side channels for receiving the resilient member.

* * * * *